United States Patent [19]

Chia et al.

[11] Patent Number: 4,824,123
[45] Date of Patent: Apr. 25, 1989

[54] MECHANICAL FACE SEAL FOR ROCK BITS

[75] Inventors: Weng-Kwen R. Chia, Irvine; George F. Anderson, Buena Park, both of Calif.

[73] Assignee: Smith International, Inc., Newport Beach, Calif.

[21] Appl. No.: 176,073

[22] Filed: Mar. 31, 1988

[51] Int. Cl.⁴ ............................................. F16J 15/38
[52] U.S. Cl. ...................................... 277/84; 277/92; 277/96.2; 277/236
[58] Field of Search ..................... 277/81 R, 82-84, 277/92, 95, 96, 96.2, 236

[56] References Cited

U.S. PATENT DOCUMENTS

| | | | |
|---|---|---|---|
| 1,470,621 | 10/1923 | Jackson | 277/96.2 X |
| 2,425,209 | 8/1947 | Snyder et al. | 277/96.2 |
| 3,180,648 | 4/1965 | Kupfert et al. | |
| 3,403,916 | 10/1968 | Durham et al. | |
| 3,524,654 | 8/1970 | Hasselbacher et al. | |
| 3,601,413 | 8/1971 | Darnell | 277/96.2 |
| 3,752,243 | 8/1973 | Hummer et al. | 277/92 X |
| 3,810,637 | 5/1974 | Bonvin | 277/96.2 |
| 3,940,154 | 2/1976 | Olsson | 277/92 |
| 4,344,629 | 8/1982 | Oelke | |
| 4,394,020 | 7/1983 | Oelke | |
| 4,560,175 | 12/1985 | Kar et al. | |
| 4,632,401 | 12/1986 | Kar et al. | 277/92 X |
| 4,666,001 | 5/1987 | Burr | |

Primary Examiner—Robert S. Ward
Attorney, Agent, or Firm—Robert G. Upton

[57] ABSTRACT

A metal-to-metal seal for a rotary cone rock bit consists of pre-lapped metal sealing surfaces formed on opposing seal rings prior to assembly of the seal rings into seal cavities formed between the rotary cones and their respective journal bearings. A first seal ring is fabricated from a softer metallic material than its opposing second metallic ring and the second ring has more seal surface area than the first ring to accommodate for cone wobble or eccentricities that may occur during operation of the bit in a borehole.

28 Claims, 3 Drawing Sheets

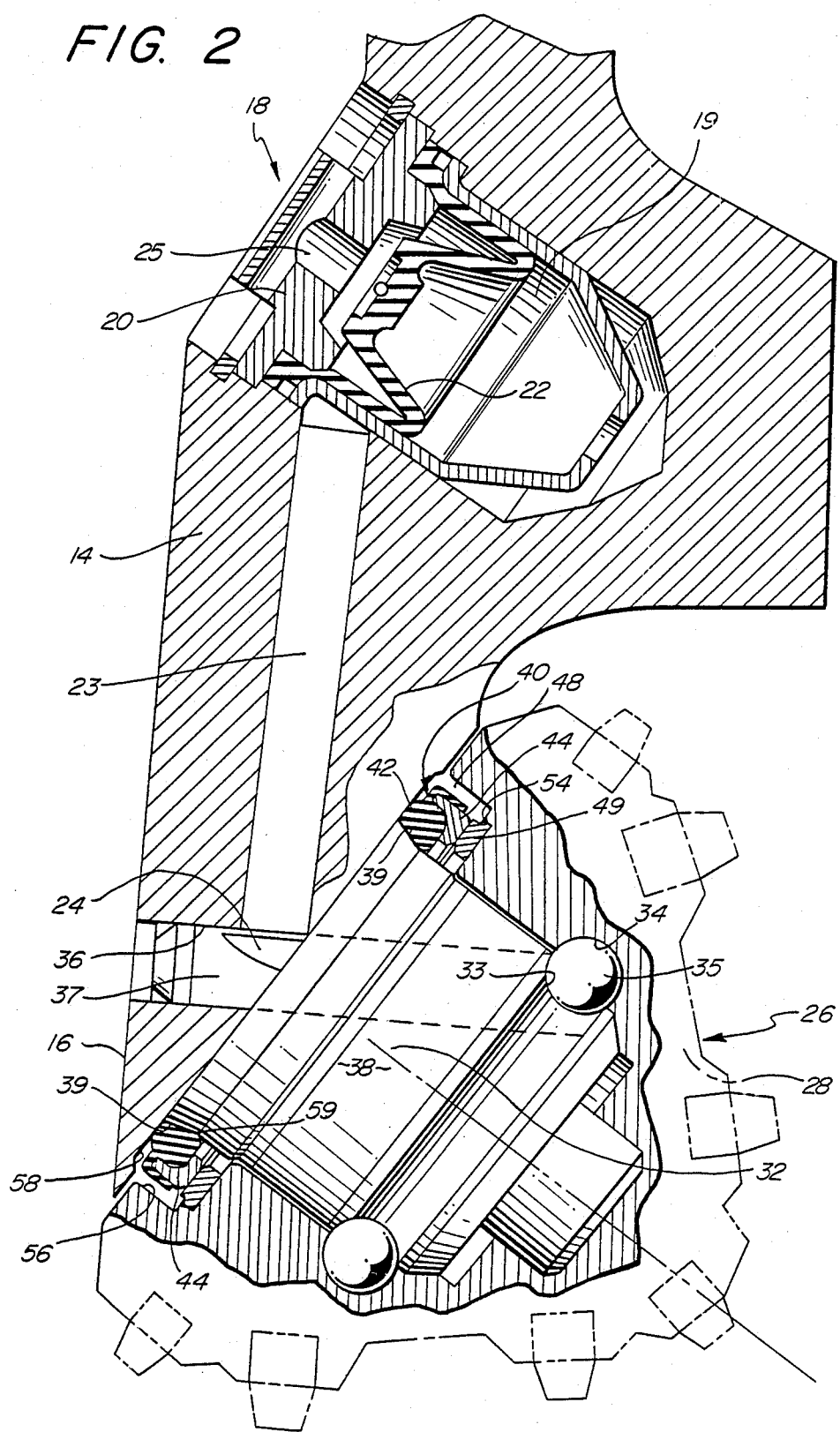

MECHANICAL FACE SEAL FOR ROCK BITS

BACKGROUND OF THE INVENTION

1. Field of the Invention

This invention relates to a high-speed seal for a rotary cone rock bit.

More particularly, this invention relates to a high-speed metal-to-metal seal for a rotary cone rock bit; the dynamic metal sealing surfaces being pre-lapped prior to assembly.

2. Description of the Prior Art

There are prior art patents that describe composite seals that are fabricated of resilient material that encapsulates or is adjacent to a metal sealing ring. For example, U.S. Pat. Nos. 4,344,629 and 4,394,020 both of which are assigned to the same assignee as the present invention, describes and teaches a metal-to-metal seal, the metal sealing surfaces of which are not pre-lapped prior to assembly. Both of these patents feature a resilient seal that initially operates to provide a seal while the metal-to-metal dynamic sealing surfaces are being lapped-in during operation of the rotary cone rock bit in a borehole. The U.S. Pat. No. 4,344,629 teaches a non-lapped metal ring that is encapsulated within a resilient material. The resilient material serves to initially provide a seal while the metal surfaces progressively lap themselves in as each rotary cone rotates on its journal while the bit works in a borehole. The U.S. Pat. No. 4,394,020 teaches a metal ring that is bonded to resilient material with a separate O-ring confined within an annular slot formed in the metal ring of the seal. The O-ring, like the U.S. Pat. No. 4,344,629 serves to provide the initial seal while the dynamic metal sealing surfaces are being lapped-in during bit operation.

U.S. Pat. No. 4,666,001 describes an earth-boring bit with metal-to-metal seals. A rigid face seal assembly is positioned between the cutter and bearing shaft of the rotary bit. The seal assembly moves axially in response to and to compensate for dynamic pressure changes in the lubricant adjacent to the seal. The metal-to-metal seal is designed to translate axially within an enlarged seal cavity during operation of the bit in a borehole to react to sudden changes of pressure across the seal face.

The foregoing patent is similar to a typical "Caterpillar" type seal, examples of which are found in U.S. Pat. Nos. 3,180,648, 3,403,916, and 3,524,654 all of which are assigned to the Caterpillar Corporation and which teach improvements to their basic metal-to-metal seal.

These patents, while they illustrate and teach metal-to-metal seals, do not elaborate on materials of the metal seals. The present invention teaches the use of a static metal sealing ring, the sealing surface of which comprise a relatively softer metallic material than an opposite dynamic sealing surface. The static or non-moving seal ring of softer material is lapped against the harder material on the dynamic oppositely facing sealing ring. The hard and soft materials of the seal rings are pre-lapped prior to assembly of the seal between a journal bearing and a rotary cone. The softer sealing surface is preferably smaller in surface area than the harder dynamic sealing surface to accommodate for cone wobble or eccentricities that may occur between the cone and the journal during operation of the rotary cone rock bit in a borehole.

The first mentioned prior art patents assigned to the same assignee as the present invention taught the use of metal-to-metal seals that were not pre-lapped prior to use, the basic seal relying on a resilient material to provide the initial seal during the lapping process. The present invention differs in that the metal rings of the seal are pre-lapped, the softer static seal ring material, being run or lapped against the harder dynamic surface of the dynamic sealing ring.

The pressure compensated metal-to-metal floating seal previously described emphasizes the pressure compensating aspect of the seal assembly confined within a seal cavity and does not specifically teach the materials used in formulating the metal-to-metal seal.

SUMMARY OF THE INVENTION

It is an object of this invention to provide an improved pre-lapped metal-to-metal seal for a sealed bearing rotary cone rock bit.

More particularly, it is an object of this invention to provide an improved pre-lapped metal-to-metal seal for a sealed bearing rotary cone rock bit wherein, the sealing surface of a first lapped seal ring is comprised of a softer material than the material that forms an opposite leg facing lapped sealing surface.

A metal-to-metal seal for a rotary cone rock bit, is positioned in a seal cavity formed between a leg of the rock bit, and a rotatable cone mounted on a journal bearing extending from the leg. The seal consists of a first metal ring, the ring forming a diameter that will fit within the seal cavity. A first radially disposed sealing surface is formed from a metallic material of the metal ring. The metal ring subsequently serves as part of the metal-to-metal seal.

A second radially disposed sealing surface is formed from a metal material that is part of or is metallurgically bonded to the cone. The second sealing surface is positioned adjacent to the first radially disposed sealing surface of the metal ring. The metallic material forming the first sealing surface is softer than the metallic material forming the second sealing surface in the cone. The first and second sealing surfaces are pre-lapped to substantially perfect a seal between sealing surfaces prior to insertion of the seal into the seal cavity formed between the leg and the cone of the rotary cone rock bit.

A resilient material is confined within the seal cavity and is positioned adjacent to the first metal ring. The resilient material is located away from the radially disposed sealing surface of the first ring. The resilient material serves to urge the first radially disposed metal sealing surface against the second metal, radially disposed sealing surface to maintain the first and second sealing surfaces in sealing engagement thereby.

An advantage then, over the prior art is the use of a hard sealing surface that is lapped against a softer sealing surface to make up a pre-lapped seal for a rotary cone rock bit.

Yet another advantage of the present invention over the prior art is the relationship of a wider sealing surface adjacent a narrower sealing surface to accommodate for wobble and eccentricity that may take place when a rotary cone rock bit works in a borehole.

The above-noted objects and advantages of the present invention will be more fully understood upon a study of the following description in conjunction with the detailed drawings.

BRIEF DESCRIPTION OF THE DRAWINGS

FIG. 2 is a partially broken away section of a leg of a rotary cone rock bit illustrating a portion of the cone mounted onto a journal bearing;

DESCRIPTION OF THE PREFERRED EMBODIMENTS AND BEST MODE FOR CARRYING OUT THE INVENTION

Figure 1:
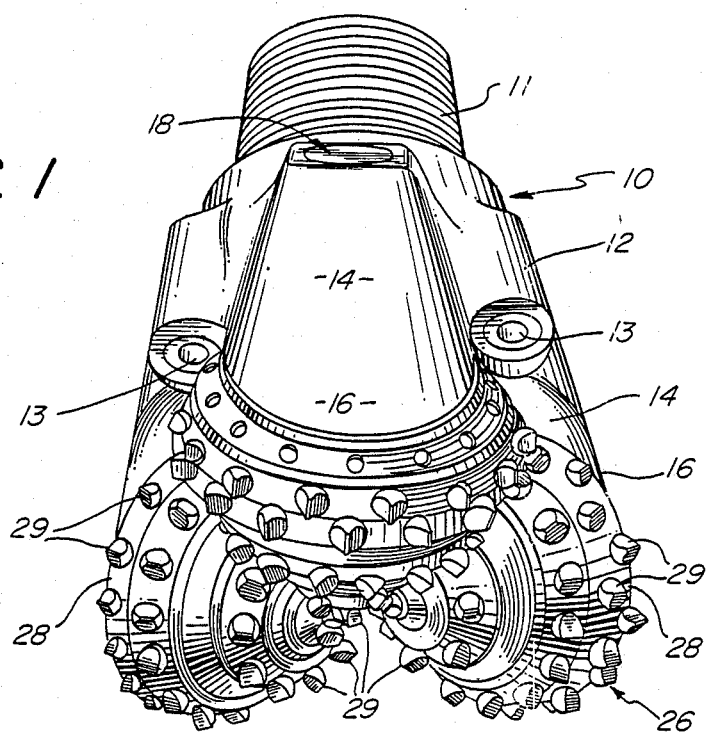
FIG. 1 is a perspective view of a typical rotary cone rock bit.

With reference now to FIG. 1, the seal bearing rotary cone rock bit generally designated as 10, consists of rock bit body 12, pin end 11 and cutting end generally designated as 26. Each cone 28 making up cutting end 26 is attached to a leg 14 that terminates in a shirttail portion 16. Each of the cones 28 has, for example, a multiplicity of equally spaced tungsten carbide cutter inserts 29, interference fitted within insert holes formed in the cone bodies 28. A lubricant reservoir generally designated as 18 is provided in each of the legs 14 to supply lubricant to bearing surfaces formed between the rotary cones and their respective journals. Three or more nozzles 13 communicate with a chamber formed inside the bit body 12 (not shown). The chamber receives drilling fluid or "mud" through pin end 11. The fluid then is directed out through the nozzles 13 during bit operation.

Turning now to FIG. 2 the rock bit leg 14 is shown in cross-section revealing the lubricant reservoir system generally designated as 18. The reservoir system comprises a reservoir cover cap 20 which closes out a lubricant reservoir cavity 19. The reservoir 19 is isolated from the cover cap by a resilient diaphragm 22; the diaphragm being responsive to exterior pressures through the hole 25 formed in the cover cap 20. Lubricant is passed down lubricant channel 23 formed in leg 14 towards ball hole 36 formed through the shirttail portion 16. Lubricant then enters into a lube channel 24 formed in a ball hole plug 37. Lubricant passes to the bearing surfaces formed between the journal 32 and the cone 28 via ball races 33 and 34.

A series of cone retention balls 35 are passed through the ball hole 36 into the bearing race 33 and 34 formed in the journal and the cone respectively. After all the cone retention balls are in place, the ball hole plug 37 is typically inserted and welded in place to retain the balls within the race.

Figure 3:
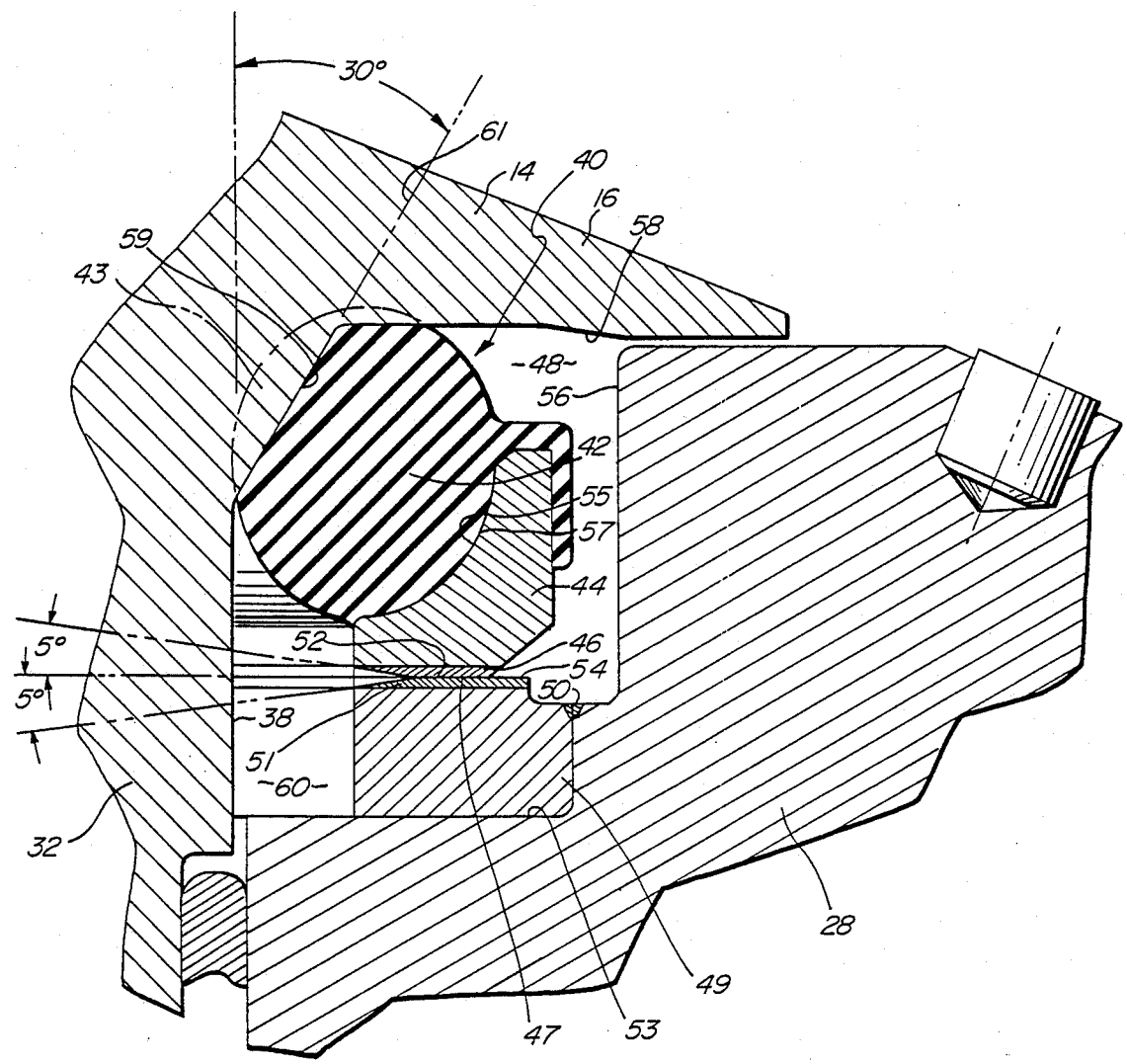
FIG. 3 is an enlarged view of a preferred metal-to-metal seal housed within the seal cavity shown in FIG. 2 formed between the journal bearing and the rotary cone.

With refernce now to the preferred embodiments depicted in FIGS. 2 and 3, a metal-to-metal seal, generally designated as 40, consists of an outer resilient material 42 that, at least, partially encapsulates an inner metal ring 44. The rubber-like resilient material 42 is designed to be larger in size than a portion of a seal cavity formed by the leg backface 58, wall 56, radial surface 54, ramp 39 and the bearing surface 38 of journal 32. A portion of the resilient material 43 is compressed by ramp 39 and leg backface 58 to urge the sealing surface 47 of the metal insert 46 against a radially disposed sealing surface 52 formed on metal insert 51 of ring 49 in cone 28. The resilient material 42, may, for example, consist of nitrile rubber. The partially encapsulated ring 44 has, for example, metallurgically bonded thereto, a relatively soft metallic material 46 that has an exterior radial sealing surface 47 that is highly polished and lapped against a similarly polished and lapped sealing surface 52 formed from harder material 51 that is, for example, metallurgically bonded to and confined within radial ring 49. The radially disposed ring 49 is preferably metallurgically bonded at the annular intersection 50. The ring is adapted to fit within a recess 53 formed within a cone mouth or seal cavity 48 of the cone 28.

The two lapped materials 46 and 51 are, for example, pre-lapped together prior to inserting the radially disposed ring 49 within recess 53 formed in the cone mouth of cone 28.

The ring 49 may, for example, be laser welded and hermetically sealed at intersection 50 by a patented process that is assigned to the same assignee as the present invention (U.S. Pat. No. 4,560,175) and incorporated by reference hereby. The lapped surface 52 of hard material 51 bonded within metal ring 49 has a surface area larger than the lapped surface area 47 of the softer material 46. The larger sealing surface 52 on material 51 accommodates for cone wobble or eccentricities that may occur during operation of the rock bit 10 in a borehole (not shown).

With reference now to the enlarged drawing of FIG. 3, the seal generally designated as 40 is shown compressed against ramp 39 and leg backface 58 within seal cavity 48. Enlarged portions 43, shown in phantom is compressed within the seal cavity 48 to assure contact of lapped surface 47 of the metal material 46 against lapped surface 52 of the harder metallic material 51 bonded to ring 49.

The seal ring 46 bonded to or part of the encapsulated ring 44 is made of a metal such as stellite or tribaloy. The tribaloy material is preferred. Tribaloy metal generally contains cobalt, silicon and molybdenum. While some of the tribaloys may contain portions of chromium, nickel or tungsten as well as other elements. The tribaloy material may range in hardness from Rockwell C 42 to 62. An example of the preferred tribaloy wear-resistant intermetallic materials is fabricated by Stoody Delor Stellite Corporation of California and is designated as T-400, T-700 or T-800. The preferred grade of Tribaloy is T-800 having a Rockwell C hardness of 62. The material 51 is fabricated from, for example, tungsten carbide having a Rockwell C hardness about 10 points higher than the Rockwell C hardness of the opposing softer material 46. For example, if the Tribaloy material 46 is T-800 with a Rockwell C hardness of 62 the Rockwell C hardness of the opposing tungsten carbide material 51 would be about 72. The two surfaces (47 of material 46 and 52 of material 51) should preferably be lapped flat within two helium light bands with a surface finish from 2 to 4 rms. The encapsulating resilient material bonded to the metal ring 44 is preferably fabricated from a nitrile composition manufactured by Royal Seal of Cucamonga, Calif.

The radially disposed ring 49 and ring 44 are pre-lapped together prior to assembly of the rings within the seal cavity 48. It would be very difficult to lap a sealing surface within the cavity or recess 53 formed in the cone 28. Hence, seal rings 44 and 49 are carefully paired and their sealing surfaces 47 and 52 completely finished prior to metallurgically securing radial ring 49 within the cone mouth or recess 53.

Moreover, the rings 44 and 49 could be fabricated from tribaloy and tungsten carbide respectively, thereby eliminating the bonding or fusion process whereby the preferred material (tribaloy 46 and tungsten carbide 51) is secured to rings 44 and 49.

Seal cavity 48 clearly shown in FIG. 3 is divided up in two areas 48 and 60. It is preferred that the internal area 60 be somewhat larger in size than area 48. The annulus 60 is formed between the inner diameter of rings 49 and 44 and the inside surface of the resilient material 42 and contains internal lubricant from the lube reservoir system 18. The area 48 that is exterior to the seal assembly 40 is exposed to the outside environment which includes mud and detritus generated when the bit 10 works in a borehole.

Seal 40 is favored when higher grease pressures occur within internal annulus 60 while lubing the bearing surfaces. Higher internal grease pressures would serve to protect the lapped surfaces since any breach of the seal between the two lapped surfaces would cause the lube under higher pressures to escape outwardly from the cavity 60. Therefore, higher interval lube pressures prevent any detritus that may be in seal cavity 48 from ruining the lapped sealing surfaces.

The resilient nitrile material 42 bonded to ring 44 at surfaces 55 of the ring 44 and 57 of the nitrile material 44 may be secured together through well-known vulcanization processes. It would also be desirable to roughen the surface 52 to about a 120 rms for better bonding of the nitrile to the ring 44.

The ramp angle of ramp 39 with respect to a centerline of the journal bearing (not shown) should be between 10 and 45 degrees. The preferred ramp angle is about 30 degrees as shown in FIG. 3. The ramp angle 39 helps secure the enlarged resilient material 42 from rotating against the journal bearing 32.

The nitrile rubber 42 may additionally be bonded to surface 59 formed by the ramp 39. The ramp surface 59, for example, is preferably roughened to about 120 rms prior to bonding surface 57 of the rubber 42 to the ramp. An adhesive may be used to adhere the surfaces together such as Loc-Tite super bond thermal cycle gel designated as 499 by the manufacturer, Loc-Tite Corporation of Connecticut.

The shallow radially disposed angle 63 (about five degrees) formed by rings 44 and 49 has two purposes. The first purpose is to feed the grease from the grease reservoir 18 to the sealing surface 47 and 52. The second purpose is to provide an easy transition and a good seal surface as the opposing surfaces wear during use. Also, the shallow angle 63 helps to prevent grooving of the opposing surfaces during operation of the bit in a borehole.

The resilient material 42 preferably of nitrile as heretofore described should have a Shore hardness of between 50 and 70. A preferred Shore hardness of the nitrile material would be 60.

The metal-to-metal seal configuration 40 as shown and just described with respect to FIGS. 2 and 3, may alternatively be comprised of a separate O-ring that nests within the dynamic metal ring, the O-ring being urged against the metal ring by the ramp as illustrated in FIGS. 2 and 3.

Figure 4:
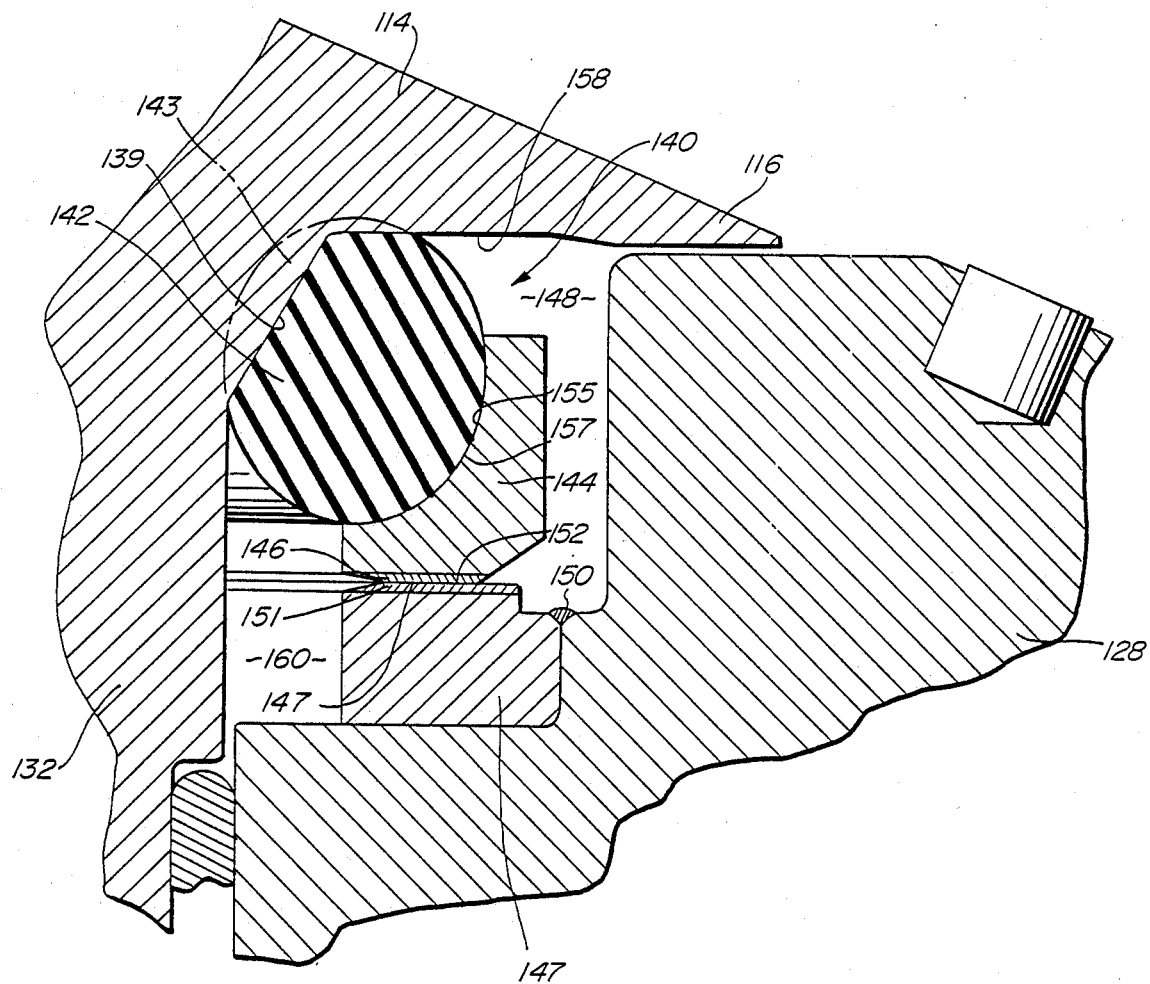
FIG. 4 is an alternative embodiment of a metal-to-metal seal enclosed within a seal cavity formed between the journal bearing and the cone of the rock bit.

For example, FIG. 4 illustrates an alternative embodiment wherein the seal assembly generally designated as 140 is comprised of a separate O-ring 142 that nests within a concave surface 155 formed by metal ring 144. The O-ring 142 is biased against the concave surface 155 by ramp 139 formed between journal bearing 132 and leg backface 158. Polished surfaces 147 and 152 of the tribaloy material 146 and the tungsten carbide material 151, thus are urged together by the combination of the oversized O-ring 142 (phantom 143) and the ramp angle 139 to assure the pre-lapped surfaces remain in sealing engagement during operation of the bit in a borehole. The metal-to-metal seal configuration 140 operates exactly the same as that which was described with respect to FIGS. 2 and 3 with the exception that the O-ring 142 is not bonded or secured to the dynamic metal ring 144.

The concave surface 155 in ring 144 may be slightly roughened to assure surface 157 of O-ring 142 does not slip within the concave surface 155 during operation of the bit.

The ring 149 preferably of tungsten carbide is secured within the cone mouth 148 of cone 128 through a preferred metallurgical bond 150 at the juncture between the outer peripheral diameter of ring 149 in the cone mouth opening 148. Again, the ring 149 may be welded to the cone by laser weld machine.

Figure 5:
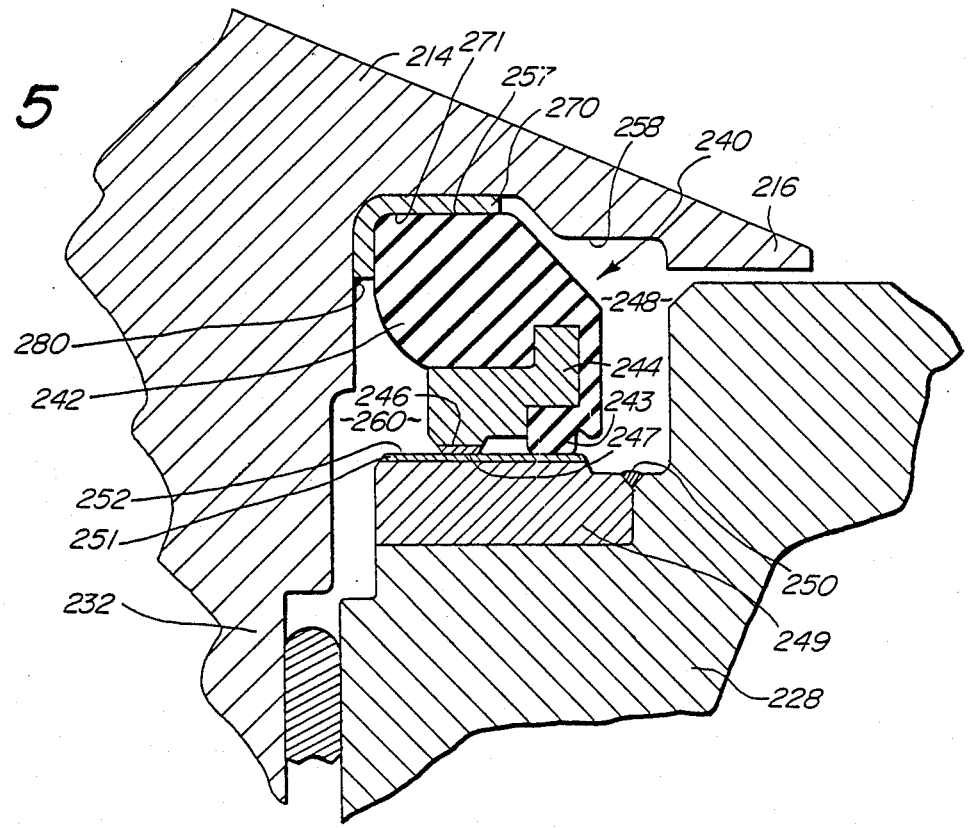
FIG. 5 is yet another embodiment of a metal-to-metal seal.

Yet another embodiment is illustrated in FIG. 5 wherein the metal-to-metal seal assembly generally designated as 240 comprises a dynamic metal ring 244 which is partially encapsulated within a rubber nitrile material 242. The nitrile material almost completely surrounds the inner ring 244 to form a rubber seal band 243. The purpose of the seal band or "bump" 243 is to provide added metal-to-metal seal protection during operation of the seal in a rock bit. The nitrile resilient material 242 is further bonded or secured to a separate circular lock ring 270. The nitrile material 242 is bonded or secured to the surface 271 of lock ring 270. The ring 270 in turn is secured to the journal bearing 232 at the juncture between the journal bearing 232 and the leg backface 258. The lock ring 270 is secured by adhesives or preferably metallurgically bonded or secured to the bearing 232 by a laser weld 280. The dynamic metal ring 244 has a layer of tribaloy 246 secured to the ring, the surface 247 being highly polished. The surface 247 mates with polished surface 252 of the preferred tungsten carbide material 251 secured to ring 249. The ring 249 is attached through the cone mouth 248 of cone 228 by a laser weld 250 also as heretofore described. It should again be noted the surface area of polished surface 252 of the tungsten carbide 251 is much larger than the surface area 247 of the tribaloy material 246. Again, this is to accommodate possible cone wobble or eccentricities between the rotating cone and its respective journal. The rubber bump 243 acts to prevent drilling mud and detritus from getting to the polished sealed surfaces 247 and 252.

The tribaloy material 46, 146 and 246 and the harder opposing material 51, 151 and 251 shown in FIGS. 2, 3, 4 and 5 may be deposited on their respective back up rings by, for example, plasma spray or D-gun (not shown). Alternatively, the material may be welded or brazed in place without departing from the scope of this invention.

The nitrile material 242 may be secured through vulcanization or securing with the adhesives heretofore mentioned to assure the integrity of the seal generally designated as 240.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A metal-to-metal seal for a rotary cone rock bit, said seal is positioned in a seal cavity formed between a leg of said rock bit, and a rotatable cone mounted on a journal bearing extending from said leg of said bit, said seal comprising:

a first metal ring, said ring forming a diameter that will fit within said seal cavity, a first radially disposed sealing surface formed from a metallic material of said metal ring, said metal ring subsequently serves as part of said metal-to-metal seal, a second metal, radially disposed sealing surface formed in said cone is positioned adjacent said first radially disposed sealing surface of said metal ring, said second metal sealing surface is formed from a metallic material in said cone, said metallic material forming said first sealing surface is softer than said metallic material forming said second sealing surface in said cone, said first and second sealing surfaces being pre-lapped to substantially perfect a seal between sealing surfaces prior to insertion of said first metal ring into said seal cavity formed between said leg and said cone of said rotary cone rock bit, and a resilient material confined within said seal cavity and positioned adjacent said first metal ring, said resilient material is located away from said radially disposed sealing surface, said resilient material serves to urge said first radially disposed metal sealing surface against said second metal, radially disposed sealing surface to maintain said first and second sealing surfaces in sealing engagement thereby.

2. The invention as set forth in claim 1, wherein said first metal ring is partially encapsulated within said resilient material, said first radially disposed sealing surface formed from said metallic material of said metal ring is exposed.

3. The invention as set forth in claim 1, wherein said resilient material is nitrile rubber.

4. The invention as set forth in claim 1, wherein said radially disposed sealing surface of said first metal ring is urged against said second metal radially disposed sealing surface by a resilient O-ring.

5. The invention as set forth in claim 4, wherein said O-ring is bonded to said first metal ring.

6. The invention as set forth in claim 5, wherein the resilient material is bonded to the first metal ring by vulcanization.

7. The invention as set forth in claim 6, wherein the resilient material is bonded to the first metal ring by an adhesive.

8. The invention as set forth in claim 1, wherein said resilient material is urged against said first metal ring by an angled ramp formed by said journal bearing, said ramp extending within said seal cavity such that the ramp forces the resilient material against said first metal ring.

9. The invention as set forth in claim 1, wherein a surface area formed by said first sealing surface is smaller than a surface area formed by said second sealing surface, said larger second surface area serves to compensate for eccentricities which may develop between said first and second pre-lapped seal surfaces during operation of said rotary cone rock bit in a borehole.

10. The invention as set forth in claim 1, wherein the material forming said first sealing surface is selected from tribaloy intermetallic materials consisting of cobalt, silicon, molybdenum chromium, nickel with a Rockwell C hardness range from 42 to 62.

11. The invention as set forth in claim 10, wherein the material forming said first sealing surface is tribaloy alloy T-800 consisting of about 3.0 percent nickel plus iron, 28.5 percent molybdenum 17.5 percent chromium, 3.4 percent silicon 0.08 percent carbon and the balance cobalt with a Rockwell C hardness of 62.

12. The invention as set forth in claim 1, wherein the material forming said first sealing surface is stellite with a Rockwell C hardness range from 42 to 62.

13. The invention as set forth in claim 1, wherein said first and second sealing surfaces is lapped flat within about 2 helium light bands.

14. The invention as set forth in claim 13, wherein the surface finish of said first and second sealing surfaces is 2 to 6 rms.

15. The invention as set forth in claim 1, wherein the material forming said second sealing surface is tungsten carbide having a Rockwell C hardness about 10 percent harder than said material forming said first sealing surface.

16. The invention as set forth in claim 15, wherein said material forming said second sealing surface is tungsten carbide with a Rockwell C hardness of about 72 when said material forming said first sealing surface is tribaloy alloy T-800 having a Rockwell C hardness of about 62.

17. The invention as set forth in claim 1, wherein said metallic material of said sealing surfaces formed on said first metal ring and said second metal is applied to said surfaces by a plasma spray process.

18. The invention as set forth in claim 17, wherein said metallic material is applied to the sealing surfaces of said first metal ring and said second metal by a D-gun process.

19. The invention as set forth in claim 1, wherein said second metal radially disposed sealing surface is formed on a separate radially disposed ring, said ring forming inner and outer circumferences, said ring is adapted to be inserted into a circumferential cavity formed by said cone, said ring is subsequently secured to said cone.

20. The invention as set forth in claim 19, wherein said metallic material forming said first sealing surface of said first metal ring and said metallic material forming said second sealing surface of said separate radially disposed ring are pre-lapped prior to assembly of said first and second metal rings into said seal cavity.

21. The invention as set forth in claim 20, wherein said second radially disposed metal ring is metallurgically secured within said circumferential cavity formed by said cone.

22. A metal-to-metal seal for a rotary cone rock bit, said seal is positioned in a cavity formed between a leg of said rock bit and a rotatable cone mounted on a journal bearing extending from said leg of said bit, said seal comprising:

a first metal ring, said ring being at least partially encapsulated within a resilient material, said ring forming a diameter that will fit within said cavity, a first exposed, radially disposed sealing surface formed from a metallic material of said metal ring, said metallic material being a tribaloy alloy with a Rockwell C hardness range from 42 to 62, said metal ring subsequently serves as part of said metal-to-metal seal, and a second radially disposed sealing surface formed in said cone is positioned adjacent said first radially disposed sealing surface of said metal ring, said second metal sealing surface is formed from a metallic material in said cone, said second metallic material forming said sealing surface is tungsten carbide having a Rockwell C hardness about 10 percent harder than said material forming said first sealing surface, said first and second sealing surfaces being pre-lapped flat within about 2 helium light bands with a surface finish of said first and second sealing surfaces within 2 to 6 rms to substantially perfect a seal between sealing surfaces prior to insertion of said first metal ring into said cavity formed between said leg and said cone of said cone rotary rock bit, said resilient material partially encapsulating said first metal ring serves to urge said first and second sealing surfaces together.

23. A metal-to-metal seal for a rotary cone rock bit, said seal is positioned in a seal cavity formed between a leg of said rock bit, and a rotatable cone mounted on a journal bearing extending from said leg of said bit, said seal comprising:

a first metal ring, said ring forming a diameter that will fit within said seal cavity, a first radially disposed sealing surface formed from a metallic material of said metal ring, said metallic material being a tribaloy alloy with a Rockwell C hardness range from 42 to 62, said metal ring subsequently serves as part of said metal-to-metal seal;

a second radially disposed sealing surface formed in said cone is positioned adjacent said first radially disposed sealing surface of said metal ring, said second metal sealing surface is formed from a metallic material in said cone, said second metallic material forming said sealing surface is tungsten carbide having a Rockwell C hardness about 10 percent harder than said material forming said first sealing surface, said first and second sealing surfaces being pre-lapped flat within about 2 helium light bands with a surface finished of said first and second sealing surfaces within 2 to 6 rms to substantially perfect a seal between sealing surfaces prior to insertion of said first metal ring into said cavity formed between said leg and said cone of said cone rotary rock bit, and a resilient material confined within said seal cavity and positioned adjacent said first metal ring, said resilient material is located away from said radially disposed sealing surface, said resilient material serves to urge said first radially disposed metal sealing surface against said second metal, radially disposed sealing surface to maintain said first and second sealing surfaces in sealing engagement thereby.

24. The invention as set forth in claim 23, wherein said first metal ring is partially encapsulated within said resilient material, said first radially disposed sealing surface formed from said metallic material of said metal ring is exposed.

25. The invention as set forth in claim 24, further comprising a metal lock ring bonded to said resilient material, said lock ring being independent from said first metal ring, said lock ring is secured to said leg within said seal cavity.

26. The invention as set forth in claim 25, wherein said lock ring is secured to said leg by laser welding.

27. The invention as set forth in claim 25, wherein said lock ring is bonded to said resilient material by an adhesive.

28. The invention as set forth in claim 25, wherein said resilient material is nitrile rubber.

* * * * *